United States Patent
Cao et al.

(10) Patent No.: US 8,468,085 B1
(45) Date of Patent: Jun. 18, 2013

(54) SYSTEM AND METHOD FOR REPORTING AND ANALYZING MORTGAGE INFORMATION

(75) Inventors: Xiaodong Cao, Saukville, WI (US); Edward G. Durant, Milwaukee, WI (US); Sandra K. Dunst, Fox Point, WI (US); Mark E. Marple, Waukesha, WI (US); David M. McCall, Hartland, WI (US); MaryAnne Seefeld, Big Bend, WI (US); Michael J. Zimmerman, Mequon, WI (US)

(73) Assignee: MGIC Investor Services Corporation, Milwaukee, WI (US)

( * ) Notice: Subject to any disclaimer, the term of this patent is extended or adjusted under 35 U.S.C. 154(b) by 3651 days.

(21) Appl. No.: 10/325,064

(22) Filed: Dec. 20, 2002

(51) Int. Cl.
*G06Q 40/00* (2012.01)

(52) U.S. Cl.
USPC ............. 705/38; 705/35; 705/39; 705/37; 705/1.1; 705/41; 705/16

(58) Field of Classification Search
USPC ............. 705/36, 37, 38, 35, 39, 41, 1.1, 16
See application file for complete search history.

(56) References Cited

U.S. PATENT DOCUMENTS

| | | | | |
|---|---|---|---|---|
| 5,930,775 | A * | 7/1999 | McCauley et al. | 705/36 R |
| 6,249,775 | B1 * | 6/2001 | Freeman et al. | 705/36 R |
| 6,513,019 | B2 * | 1/2003 | Lewis | 705/35 |
| 7,089,503 | B1 * | 8/2006 | Bloomquist et al. | 715/780 |
| 2002/0198811 | A1 * | 12/2002 | Wizon et al. | 705/36 |
| 2003/0018558 | A1 * | 1/2003 | Heffner et al. | 705/37 |
| 2003/0036994 | A1 * | 2/2003 | Witzig et al. | 705/38 |
| 2004/0064402 | A1 * | 4/2004 | Dreyer et al. | 705/38 |
| 2004/0073508 | A1 * | 4/2004 | Foster et al. | 705/38 |

OTHER PUBLICATIONS

InSite/Spectrum, "Instant Access to Critical Data," http://www.ips-sendero.com/solutions/mortgage/brochures/insite/default.asp, 2 pp.
IPS-Sendero ECLIPS, "Quick and easy Analysis", http://www.ips-sendero.com/solutions/mortgage/brochures/eclips.asp; 4 pp.
LoanPerformance.com, Market Pulse Online,: http://www.loanperformance.com; 1 p.
McDash Analytics, Inc., http://www.mortgagemag.com/guide/c005/c005371.htm; 1 p.

* cited by examiner

*Primary Examiner* — Tien Nguyen
(74) *Attorney, Agent, or Firm* — Foley & Lardner LLP (57) ABSTRACT

A reporting and analyzing mortgage information system and method include receiving portfolio information from a lender, presenting the lender with predictive modeling and recapture metrics. The system provides for the dynamic definition of data sets and report sets using the received portfolio information and industry-wide recapture metrics. The recapture metrics are derived by matching loan payoff and new loan origination activity.

16 Claims, 6 Drawing Sheets

SYSTEM AND METHOD FOR REPORTING AND ANALYZING MORTGAGE INFORMATION

FIELD OF THE INVENTION

The present invention relates generally to asset reporting and analyzing systems. More particularly, an exemplary embodiment of the present invention relates to systems and methods of reporting and analyzing mortgage information.

BACKGROUND OF THE INVENTION

The mortgage industry has a variety of challenges. First, mortgage companies are actively involved in retaining and recapturing borrowers in their loan servicing portfolios. In general, the strategies that mortgage companies develop and implement are built upon analytics of historic borrower and portfolio behavior. Nevertheless, mortgage companies have not had easy access to their own loan/borrower recapture metrics and have had limited access to mortgage industry portfolio data in order to benchmark recapture metrics.

Second, mortgage companies also require frequent and ongoing analysis of the major risks of their business. Two of these risks are borrower prepayment and default risk. The risk analysis that is done is typically an iterative process of question→analysis→review→action→question, etc. There are innumerous stratifications of information that are important to the understanding of risk and the operation and strategic direction of a mortgage company. The possible combinations thereof make the analysis unwieldy.

Third, existing mortgage data and query tools present only current-period or limited historic perspectives of a company's portfolio behavior or the industry portfolio behavior. While this is significant, and sometimes the only information available, more detailed retrospective and prospective insights are critical to successful strategic decision-making and planning. Prepayment risk and default risk are the primary risks of a mortgage company and effective management of those risks is an essential component of success.

Fourth, it is important to have information available quickly for users with varying technical expertise. Other mortgage data providers deliver data on a monthly basis via a compact disc (CD) or other media. When data is provided via a CD or other media, it takes time to create the CD, mail it to the mortgage company, who then must load the data to a workstation and attach it to an appropriate access tool. Data recipients must store the historical data and obtain some level of application knowledge for a user to easily access the information.

Fifth, it is important that user response time is very quick. Sixth, it is important that when comparing the performance of one portfolio to another or to Mortgage Industry Portfolio Data that a common and consistent method is used to arrive at the statistical data. Contributor's' data can contain different values to represent the same data. For example, a code of "1" in one portfolio could mean a conventional loan but a "1" could mean an FHA (Federal Housing Administration) loan in another portfolio.

Thus, there is a need for a system and method for overcoming these and other challenges to the mortgage industry. Further, there is a need for a system and method of reporting and analyzing mortgage information in new ways. Even further, there is a need to provide mortgage companies with improved tools to enhance their business.

SUMMARY OF THE INVENTION

An exemplary embodiment relates to a method for reporting and analyzing mortgage information. The method can include receiving loan portfolio information from a mortgage lender, presenting the lender with the received portfolio information and industry-wide information, results of predictive modeling and recapture metrics, and providing for the dynamic definition of data sets and report sets using the received portfolio information and industry-wide metrics. The recapture metrics are derived by matching loan payoff and new loan origination activity.

Another exemplary embodiment is related to a mortgage reporting and analysis system. This system can include a communication module and a processing module. The communication module is configured to receive portfolio information from a mortgage lender via a communication network and communicate processed mortgage information and mortgage industry-wide information to the lender. The processing module is configured to standardize received portfolio information from a plurality of lenders. The recapture metrics are derived by matching loan payoff and new loan origination activity. The prepayment analysis is derived from predictive modeling results and actual payoff outcomes. The processing module is further configured to dynamically define data sets and report sets using the received portfolio information and industry-wide metrics.

Another exemplary embodiment is related to an application hosted by a server system configured to provide mortgage information to a client system. This application can include means for receiving loan portfolio information from a lender, means for presenting the lender with the received portfolio information and industry-wide metrics, and means for providing dynamic definition of data sets and report sets using the received loan portfolio information and industry-wide metrics.

Other principle features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals denote like elements, and.

DETAILED DESCRIPTION OF EXEMPLARY EMBODIMENTS

A system for and method of reporting and analyzing mortgage information are described. In the following description, for purposes of explanation, numerous specific details are set forth in order to provide a thorough understanding of the present invention. It will be evident, however, to one skilled in the art that the exemplary embodiments may be practiced without these specific details. In other instances, structures and devices are shown in block diagram form in order to facilitate description of the exemplary embodiments.

In one embodiment, a computer system is used which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the functions described. Thus, the embodiments described herein are not limited to any specific combination of hardware circuitry and software, nor to any particular source for the instructions executed by the computer system.

Figure 1:
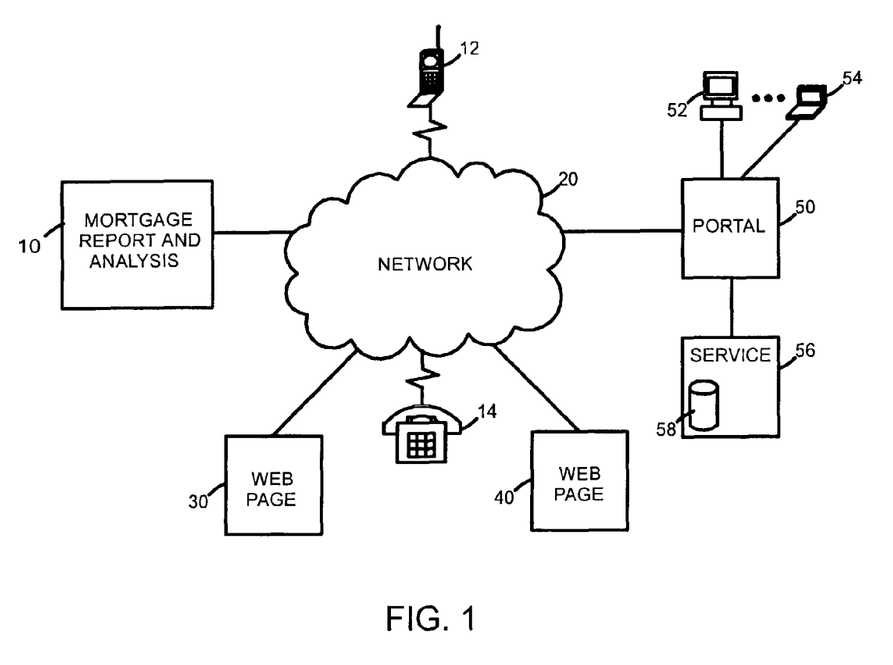
FIG. 1 is a general diagrammatical representation of a reporting and analysis system connected to a communications network.

FIG. 1 illustrates a reporting and analysis system. This system can include a connection between a lender analysis and reporting system 10 and a network 20. Lender analysis and reporting system 10 provides access to financial information available locally and via network 20. In an exemplary embodiment, network 20 is the Internet, a worldwide network of computer networks that use various protocols to facilitate data transmission and exchange. Network 20 can use a protocol, such as, the TCP/IP network protocol or the DECnet, X.25, and UDP protocols. In alternative embodiments, network 20 is any type of network, such as, a virtual private network (VPN), an Ethernet, or a Netware network.

Network 20 can include a configuration, such as, a wide area network (WAN) or a local area network (LAN). Network 20 preferably provides communication with Hypertext Markup Language (HTML) Web pages 30 and 40. Web pages can also include XML, Extensible Markup Language. Web pages 30 and 40 include a variety of data on a variety of web servers. The data can be transferred over Network 20 using a secure web connection. Network 20 also provides communication with a communication network portal 50 which couples computers 52 and 54 and a service 56 including a database 58 to network 20. Service 56 is any type of company, content or service provider with a connection to network 20. Database 58 is a storage medium for data and may be an optical, magnetic, or any other suitable storage medium.

Generally, lender analysis and reporting system 10 can be implemented using a computer server configured by software. Preferably, the server includes read/write memory, such as, disk drives and other storage. A customer, client, or user can access lender analysis and report system 10 via a web page 30 or 40 which is conveyed to the client at computer 52 or 54. Computers 52 or 54 can be any type of computing device, including work stations, laptops, notebooks, personal digital assistants (PDAs), cell phones, beepers, or other equipment capable of communication with network 20. In another embodiment, lender analysis and reporting system 10 can be accessed via telephones, such as, a cell phone 12 or a standard telephone 14. Other user interface platforms may also be provided for using lender analysis and reporting system 10. Such user interface platforms include, for example, WAP (wireless application protocol) and web interfaces.

In an exemplary embodiment, lender analysis and reporting system 10 includes a database of information related to loans, and, more preferably, information related to mortgage loans and mortgage loan portfolios. This database may include information on loan level portfolio servicing provided on a periodic basis by data contributors 230. Typically, the data contributors 230 are lenders such as companies that provide and service mortgage loans. The data contributed is typically loan information, and, preferably, the loan information is mortgage loan information.

The data contributors can provide the data to the lender analysis and reporting system 10 in a number of ways. For example, the data contributors 230 can send tapes or other media capable of storing the data to the location of the lender analysis and reporting system 10. In another example, the data can be sent across Network 20. In an exemplary embodiment, data contributors 230 provide data as the calendar month-end closing date. As new contributors are added, their information is usually presented on a prospective basis, or, in an alternative embodiment, the information may be back-loaded. Implementation can include the processing of 12 months of historical data. Preferably, historical data is available for about 13 months. However, it should be understood that this is one example of one configuration of the lender analysis and reporting system 10 and should not be construed to limit the system, for example, to including only 13 months worth of data or requiring data contributors to submit data over the Network 20. The lender analysis and reporting system 10, for example, may include 18, 24, 28, or 36 months worth of data.

In an exemplary embodiment, the data provided to the lender analysis and reporting system 10 comprises the mortgage company's own mortgage portfolio information. This would typically include any debt that is collateralized with real estate. This may include mortgages that are in a first lien position, second lien position, or other forms of mortgage debt such as home equity lines of credit.

Access to lender analysis and reporting system 10 can be controlled in a variety of ways. For example, users may have access to both their own portfolio data and industry-wide data, or users may only have access to one of these types of data. Additionally, different users within the same mortgage company may have differing levels of access within the system.

Advantageously, lender analysis and reporting system 10 provides the capability to access both portfolio data and industry-wide recapture metrics in a dynamic environment. For each contributor's data, these metrics can be derived and a series of programs can match loan payoff and new loan origination activity by borrower social security numbers, for example. The data is stored for data contributors at the loan level and available for viewing in an aggregated fashion for a contributor's own portfolio as well as for the industry. Several firms publish recapture metrics on a periodic basis on a pre-defined set of dimensions. Desirably, lender analysis and reporting system 10 provides the user the ability to dynamically define data sets (e.g. stratification levels) and report sets (e.g. choice of portfolio dates and analysis periods) to satisfy their individual purposes.

Lender analysis and reporting system 10 can provide information such as key metrics, along with default and prepayment performance information on a portfolio. It can also provide the ability to track prepayment speeds, customers retained, customers lost, and the characteristics of each. Lender analysis and reporting system 10 provides detailed analysis and virtually unlimited possibilities for data reports.

Lender analysis and reporting system 10 also allows for slicing and dicing, drill-down, and aggregation of recapture metrics within hundreds of dimension combinations. Preferably, lender analysis and reporting system 10 can offer over 30 stratification choices, which can be selected in any order, and without a limit on the choices. These technical capabilities allow users to quickly and accurately access data to answer their questions regarding their company's risk profile. This feature allows the user to devote more time to the analysis and review of the findings as opposed to running the query. This is advantageous in at least three respects: 1) more questions can be posed and answered, 2) more meaningful answers can be developed, and 3) more time can be spent on developing risk management strategies.

Lender analysis and reporting system 10 incorporates prepayment and default modeling estimates into the query tool. Estimates are assigned at the loan level, which allows a user to see these aggregated forecasts in innumerable stratifications. Therefore, users can integrate historical analysis and future estimates of risk into their analysis and strategic development.

In an exemplary embodiment, lender analysis and reporting system 10 houses data in a Microsoft SQL Server database. Data is summarized for each data contributor and for the industry mortgage portfolio data and Microsoft OLAP (on-line analytical processing) cubes ("cubes") are built with the summarized data. A web server goes to the cubes on the SQL server and displays the web pages on the user's client workstation. Anyone with Internet access can access lender analysis and reporting system 10 with an authorized login name and password ID. By having another party host the application, a user has more timely access to the data using a user-friendly interface, with no need for any additional programming or data storage.

The use of "cubes" allow users accessing the lender analysis and reporting system 10 to quickly make sense of the vast data that is available. Cubes allow users to get at the key pieces of information in this data so as to make timely decisions. A "cube" is generally a set of data that is organized and summarized into a multidimensional structure defined by a set of dimensions and measures.

In at least one exemplary embodiment, lender analysis and reporting system 10 uses OLAP technology from Microsoft Corporation of Redmond, Wash., using partitions across contributor's data, across multiple month's data to provide this quick response. It can also distribute the load across multiple servers to improve the performance as the database increases in size.

Further, customized program code can be included in lender analysis and reporting system 10 for each data contributor 230 so that a common data set is built with predetermined code sets. Another example of how data is standardized would be the methodology used to calculate a recapture rate. Lender analysis and reporting system 10 processes portfolio data in a consistent manner to determine if a loan that pays off is recaptured with a new loan returning to the portfolio by the same borrowers. Further customization is possible by allowing the user to create and/or implement custom fields within a user's own data.

Further details of lender analysis and reporting system 10 are described. Some of the features that may be included in lender analysis and reporting system 10 include: data handling functions, recapture analysis, prepayment analysis, portfolio statistics, drilldown, user created reports, favorites, help, etc. Access to individual features may be controlled by assigning a custom level of access to a particular username and password used to access the lender analysis and reporting system 10. For example, the favorites feature saves unique reporting selection information by username and password. Other features such as help/contact us are available to everyone who has access to lender analysis and reporting system 10.

A user interface for lender analysis and reporting system 10 can include tabs available for selection of the features. Example tabs can include: portfolio statistics, prepayment analysis, recapture analysis, user created reports, favorites, help/contact us, and signout.

The features mentioned above are described in further detail in the following. These features are provided only as examples and are not meant to be limiting in any way.

A. Data Handling

The data submitted by one data contributor 230 is often in a different format than data submitted by another contributor. This can be a serious problem for users attempting to access and use the data. To overcome this problem, lender analysis and reporting system 10 can convert the data into a common format. Typically, the conversion process takes place when the data is received. However, the data can also be converted at other times.

Figure 2:
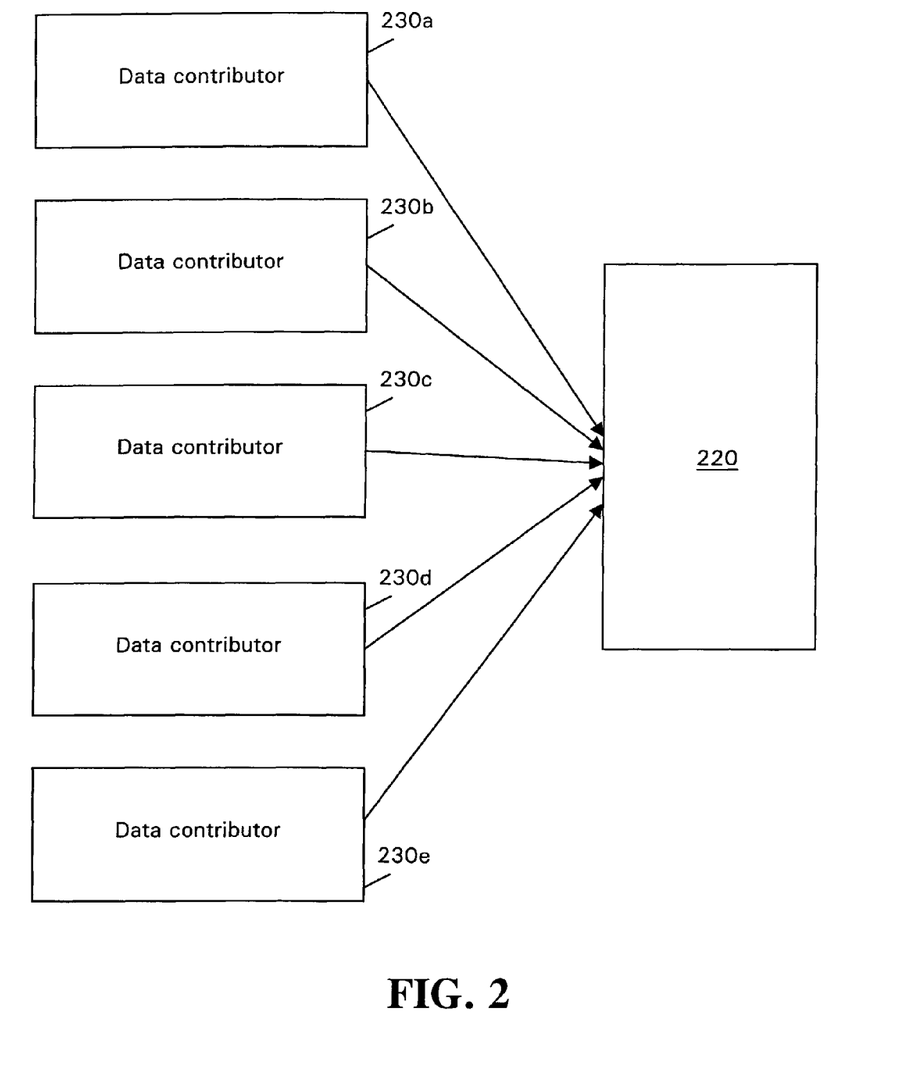
FIG. 2 is a general diagram of information included in the reporting and analysis system of FIG. 1 in accordance with another exemplary embodiment.

FIG. 2 is a general diagram of a process for standardizing the data received from a variety of data contributors. Data contributors 230*a*, 230*b*, 230*c*, 230*d*, and 230*e* (collectively "data contributors 230") represent the many different entities that submit mortgage portfolio data to lender analysis and reporting system 10. Standardization module 220 receives the data from data contributors 230 and converts the data to a standardized data set. One method of converting the data may include converting the data to use standard field names. Standardizing the data allows users to compare the same type of data from multiple data contributors 230. If the data was not standardized, the user would be less likely to be able to use the data in a meaningful manner. Typically, standardization module 220 is part of the lender analysis and reporting system 10. However, standardization module 220 could be a stand alone module separate from the lender analysis and reporting system 10.

The data submitted by data contributors 230 can be used to create files such as recapture files, payoff files, and files with prepayment scores. Many of these files would need to be updated each time a contributor contributed data to the lender analysis and reporting system 10. Assuming that the lender analysis and reporting system 10 requires data to be submitted on a monthly basis, each time data is submitted the prepayment scores, recapture, and payoff files would need to be updated. Potentially, x files (x is the number of months for which the lender analysis and reporting system 10 keeps records) per client per month may have to be updated with additional recapture and payoff information.

For example, when someone pays off their mortgage by refinancing or otherwise, the payoff file data supplied by a data contributor is applied to the prior month-end data and every month back from that date. For example, payoffs in the 02/01 file would get applied to the January 2001, December 2000, etc files.

In another example, the recapture file data may be applied to the month in which the payoff of the recaptured loan occurred and be applied to every month back from that date. For example, recaptures in the 2/2002 file would be applied to whatever month the payoff of the old loan occurred (i.e. one loan's payoff occurs in 12/2001, another's in 10/2001).

The lender analysis and reporting system 10 may include a number of additional data handling features that make it quicker and more convenient for the user to access the needed data. One feature may be that the lending analysis and reporting system 10 delivers information on a graphical user interface to be viewed by users with the minimal amount of scrolling possible. This prevents the user from wasting time scrolling looking for desired information.

Another feature can be that the lender analysis and reporting system 10 provides print selection functionality that will allow users to request that reports be delivered as hardcopy printed on 8.5"×11" paper in addition to or in place of a report viewed on a computer screen. Another feature may be to provide selection functionality that will allow users to request that reporting information be downloaded to their local storage device.

The lender analysis and reporting system 10 includes a variety of formatting options for returning information to the users. In an exemplary embodiment, a graphic summary report is displayed on a monitor and can also be printed by the user. Also, many of the reports that can be generated in numerical form can also be displayed on the user interface in the form of a graph.

B. Recapture

Recapture reports can provide recapture statistics for those loans paid off during a selected analysis time period. Recapture analysis measures the mortgage lender's ability to retain its customers who have prepaid an existing mortgage. If the mortgage lender succeeds in originating a new loan (even if of a different type) for the same customer, such an outcome constitutes a "recapture". Following this logic, a prepaid loan can be either "recaptured" or "lost". Each successful recapture increases the lender's overall portfolio recapture rate.

The recapture feature of the lender analysis and reporting system 10 allows users to access a variety of advantageous information. For example, the user may be a lender that would like to compare the number of customers it recaptures with the number of customers that other similarly situated lenders recapture. This allows the lender to develop and implement a variety of measures to better compete with other lenders. For example, the lender may learn that since implementing a new marketing program recapture has markedly increased for a certain type of loan when compared to other lenders' recapture statistics.

In an exemplary embodiment, a borrower is considered "recaptured" after payoff if a new loan is added to the portfolio with a social security number that matches that of the primary or secondary borrower on the paid off loan within the selected time period. Loans that are removed due to foreclosure or servicing release are typically not included in the analysis population. Servicing released loans, i.e., loans where the loan servicing was sold to another mortgage company, are not included because the true outcome of the loan is difficult to determine.

Figure 3:
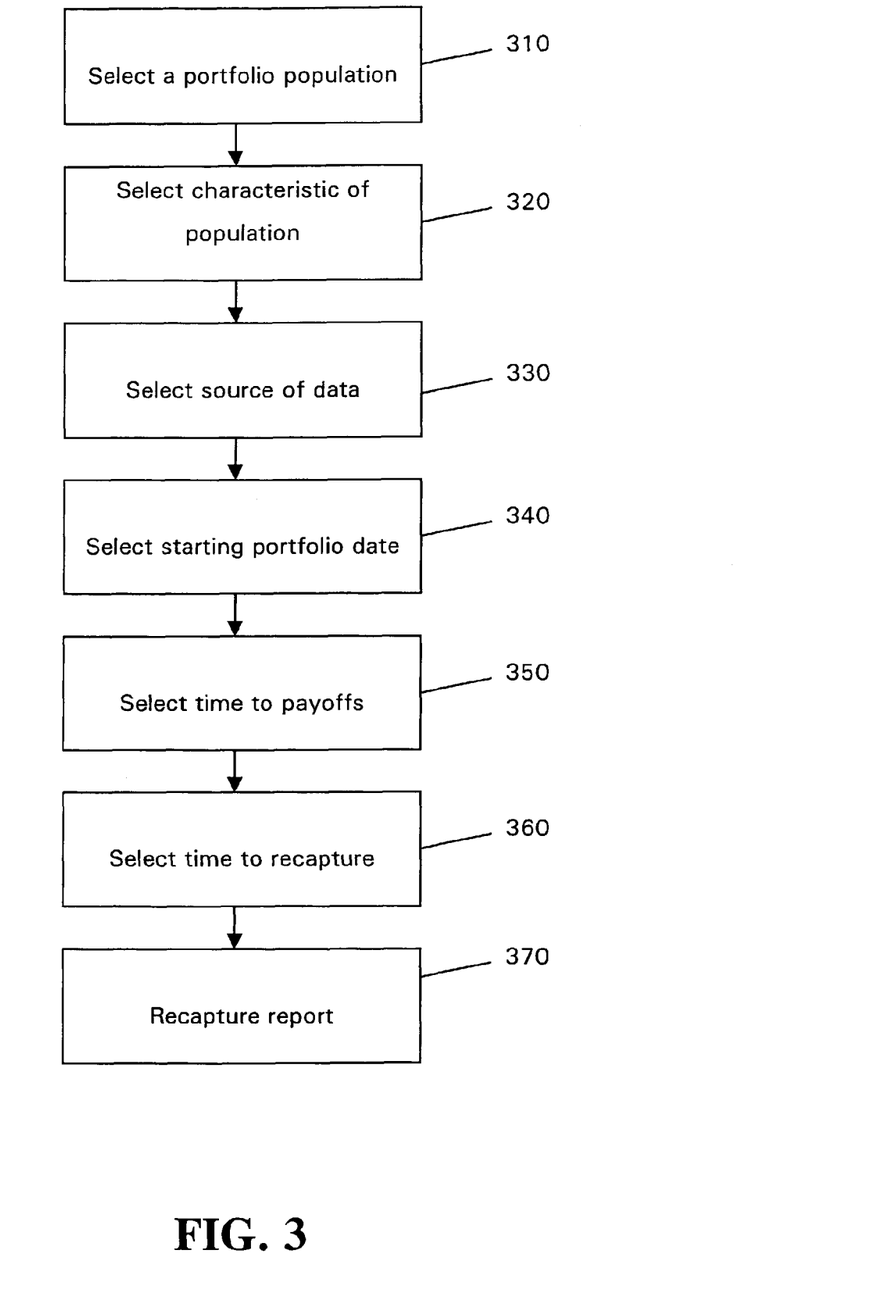
FIG. 3 is a block diagram of a reporting and analysis system in accordance with another exemplary embodiment.

FIG. 3 discloses an exemplary method of providing recapture statistics. In step 310, the user selects a portfolio population to use in generating the recapture statistics. The portfolio population represents a selection of various loans and the information related to that loan to be analyzed. For example, one population may include all loans available in the lender analysis and reporting system 10. In another example, a population may include only those loans paid off during a selected time period. In yet another example, the user may desire to view only the characteristics of recaptured loans. In this example, the population may only include recaptured loans. The user would then be able to view the various characteristics of only recaptured loans.

After selecting a portfolio population, the user selects a characteristic of the population as shown in step 320 of FIG. 3. In an exemplary embodiment, the characteristics that are available are dependent on the specific population selected. For example, if the population is all loans, it may be that the only characteristic available to report is recapture statistics on the entire population. If the population is paid off loans, the following five characteristics may be available to generate a report: (1) unpaid principal balance (UPB) & principal and interest payment (PI), (2) original & adjusted loan to value ratio, (3) loan age & remaining term, (4) note rate, and (5) variances summary. The first 4 reports present information about paid off loans that were recaptured as well as those that were lost. The recaptured loans are further presented with a comparison of statistics for the old (paid off) and new loans. Preferably, the variances summary report includes the total count of paid off loans, the count and percent of those loans recaptured and the variance between old and new loan characteristics. In this manner, the user can obtain information on a specific characteristic of a specific population of loan data. It should be understood that the characteristics available for any given population may vary substantially. Also, the characteristics need not be dependent on the population selected. For example, the same characteristics may be presented for multiple or all of the available populations.

After selecting the portfolio population, the user then selects a source for the data in step 330. It is important to not confuse the source of the data as referred to in step 330 with the portfolio population as that term is used in step 310. In selecting a source of the data, the user typically is not selecting a new population. Rather, the source of the data refers to where the data originates. For example, the user may be presented with the option of viewing the user's own data, industry-wide data, or both to generate the report. The user is thus presented with a greater level of flexibility in choosing what data to view when the recapture statistics report is generated.

After selecting the source of the data, the user selects a starting portfolio date in step 340. In an exemplary embodiment, the lender analysis and reporting system 10 includes a limited amount of data to search. Typically, the data is broken down into a month by month format and is limited to 13 months. The choices are dynamically populated with the dates of the data available in the system. The starting date chosen represents the loan data as of that month's ending date. For example, the user may be given the option of selecting 2/2002, 3/2002, or 4/2002. If the user selects 2/2002, the user's starting portfolio analysis date would be Feb. 28, 2002.

As part of step 350, the user next chooses the number of months of payoffs to analyze. This allows the user to select the number of months of payoffs from the starting portfolio date to be included in the analysis timeframe. The choices are dynamically populated with the data available in the system. For example, if the starting portfolio analysis date is 2/2002 and the population data includes data up through 9/2002 then the user is able to select 1 month of payoffs (March 2002 payoffs) through 7 months of payoffs (March 2002 through September 2002).

The user can then specify the number of months from the time the loan was paid off to the time of recapture as shown by step 360 in FIG. 3. Only loans recaptured within the specified number of months would be shown. For example, assume that the database is current through the month end of 6/2002. If the user selects a portfolio starting date of 2/2002 as used in the above examples, along with 3 months of payoffs and 3 months to recapture. The user would be able to review the payoffs from 3/2002, 4/2002 and 5/2002 and new loans from March through June. The 3/2002 payoffs are checked against 3 months of new loans (3/2002, 4/2002, and 5/2002). The 4/2002 payoffs are checked against 3 months of new loans (4/2002, 5/2002, and 6/2002). The 5/2002 payoffs are checked against 2 months of new loans (5/2002 and 6/2002) as only 2 months are available with the June month-end data load.

The recapture months selection options display in blue to indicate that future data loads will not affect the recapture statistics. Likewise, the selections displayed in red indicate that future data loads could affect the recapture statistics. In the above example, the recapture statistics for payoffs in 5/2002 are only partially available because the information for July 2002 is not available. Therefore, the statistics or a link to the statistics would be displayed in red because they would change once the data for July 2002 was entered.

Optionally, after completing step 360, the user may select a stratification variable. In the final recapture report generated in step 370 the stratification variable is compared against the characteristic chosen in step 320. In an exemplary embodiment, this is done by displaying a table where the stratification variable is displayed as rows and the characteristic of the population is displayed as columns. For example, if the stratification variable is loan purpose then the table may include row headings of "purchase," "refinance," or "home improvement." If the characteristic is UPB and P&I, the column headings may be divided in the following manner. First there would be two columns, one for recapture loans and one for lost loans. In the column for recaptured loans it may be further divided into two columns displaying old loan information and new loan information. In the column for lost loans only the old loan information is displayed because the loan was not recaptured. The old and new loan columns may each then be divided into two new columns displaying information such as UPB and average P&I. In this manner the user could determine that customers who obtained the new loan (i.e., recapture loan) had a significantly different UPB (higher, lower, etc.) than those customers that were not recaptured. Other stratification variables may be available for further drilldown once the report is presented.

C. Prepayment

Prepayment reports provide prepayment model scoring analysis. The reports provide a constant prepayment rate forecast for the selected month-end starting date or an analysis of the selected forecast in comparison to the actual prepayment performance for a portfolio during a selected analysis time period. Prepayment statistical analysis is based around the results of a prepayment model. Prepayment models predict the likelihood that any given mortgage will prepay within a specific time period of being scored. Typically, loans that have been sold with their servicing released or removed due to foreclosure during selected analysis time period are removed from the population of loans analyzed.

Advantageously, the constant prepayment rate forecast allows lenders to frequently analyze their exposure to future prepayment risk. Lenders can then reassess their exposure accordingly.

Figure 4:
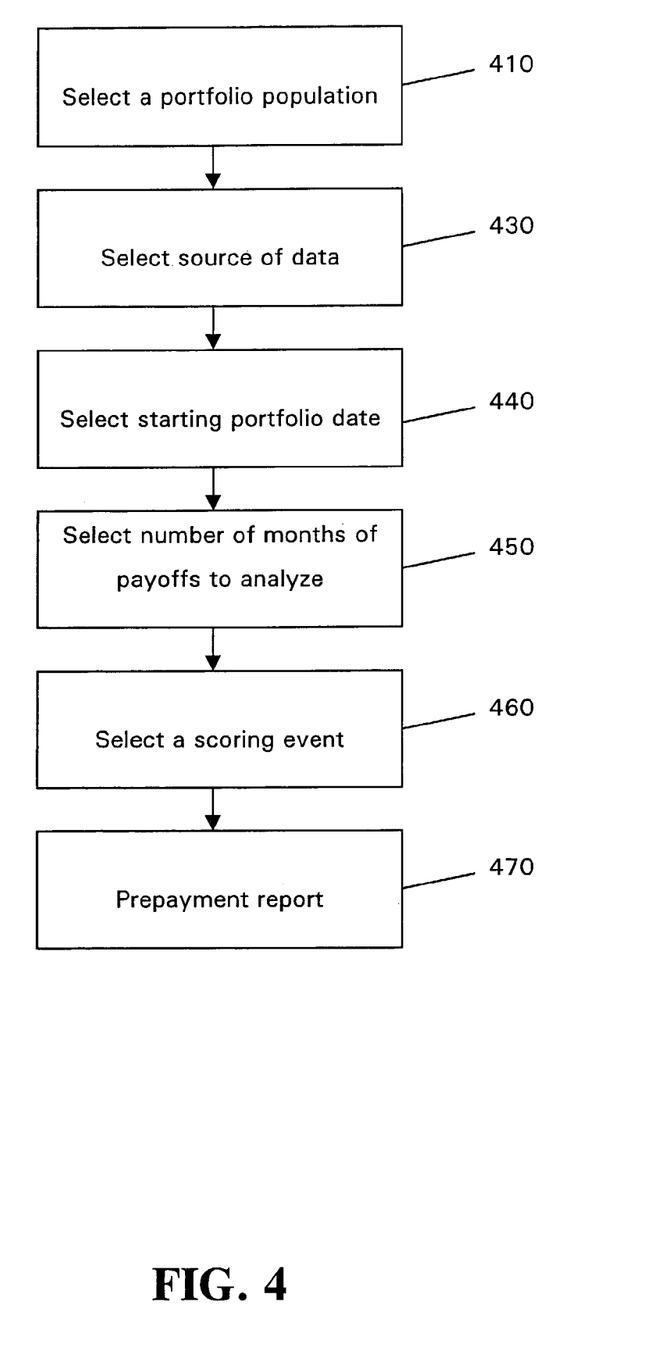
FIG. 4 is a block diagram of a reporting and analysis system in accordance with another exemplary embodiment.

FIG. 4 discloses an exemplary method of providing prepayment statistics. In step 410, the user selects a portfolio population to use in generating the prepayment statistics. The portfolio population represents distinct types of loans grouped together. For example, one population may include all adjustable rate mortgages and another population may include all fixed rate mortgages. Various other populations may also be included.

After selecting the portfolio population, the user then selects a source for the data in step 430. It is important to not confuse the source of the data as referred to in step 430 with the portfolio population as that term is used in step 410. In selecting a source of the data, the user typically is not selecting a new population. Rather, the source of the data refers to where the data originates. For example, the user may be presented with the option of viewing the user's own data, industry-wide data, or both to generate the report. The user is thus presented with a greater level of flexibility in choosing what data to view when the prepayment statistics report is generated.

In step 440, the user selects a starting portfolio date. In an exemplary embodiment, the lender analysis and reporting system 10 includes a limited amount of data to search. Typically, the data is broken down into a month by month format and is limited to 13 months. The choices are dynamically populated with the dates of the data available in the system. The starting date chosen represents the loan data as of that month's ending date. For example, the user may be given the option of selecting 2/2002, 3/2002, or 4/2002. If the user selects 2/2002 then the user's starting portfolio analysis date would be Feb. 28, 2002.

After selecting a starting portfolio date, the user then selects a number of months of payoffs to analyze as shown in step 450 in FIG. 4. In this step the user is able to select the number of months of payoffs from the starting portfolio date to be included in the analysis timeframe or a "forecast only" without the actual payoff analysis. The choices are dynamically populated with the data available in the system. For example, if the starting portfolio analysis date is 2/2002 and the population data includes data up through 9/2002 then the user is able to select 1 month of payoffs (March 2002 payoffs) through 7 months of payoffs (March 2002 through September 2002).

In step 460, the user selects a scoring event. Typically, only scored loans are included in the prepayment statistics analysis. A wide variety of scoring environments could be used. In an exemplary embodiment seven scoring fields are used to represent various scoring environments. Some of the most common examples of scoring environments are as follows: (1) Static-environment based on current market rates, (2) static minus 50 basis points, (3) static minus 100 basis points, (4) static minus 200 basis points, (5) static plus 50 basis points, (6) static plus 100 basis points, and (7) static plus 200 basis points. In an exemplary embodiment, the static scoring environment is used when displaying industry-wide prepayment statistics and forecasts, and the other scoring environments are available only when the user is accessing the user's data.

In relation to the product stratification used in prepayment reporting, it should be noted that adjustable rate mortgage servicing (ARM) data is scored and analyzed separately from the fixed rate mortgage servicing (FRM) data. The need to clearly distinguish between ARM and FRM data is based on the fact that these two types of mortgage servicing are very different in nature and the prepayment model uses different logic and assumptions to analyze them. Thus in terms of prepayment reporting, ARM and FRM data can be thought of as separate populations. As discussed above, the prepayment analysis includes an analysis population selection criteria for ARM or FRM analysis.

The last step is output of the prepayment report as shown in step 470. After selecting a scoring event, the user may select a stratification variable. The prepayment report format is typically based on the product type and stratification characteristics selected. For example, the following stratification information might be displayed for an ARM loan: loan count, unpaid principal balance (UPB), % of UPB, average UPB, weighted average coupon rate, weighted original term, weighted remaining term, weighted seasoning, weighted original loan to value ratio (LTV), weighted calculated adjusted LTV, predicted weighted average coupon rate, weighted months to next interest rate adjustment, weighted maximum rate, weighted original rate, weighted lifetime cap, annualized constant prepayment rate (CPR) actual, annualized CPR estimate, CPR variance, and variance as a % of actual.

The following information might be displayed for FRM loans: loan count, unpaid principal balance (UPB), % of UPB, average UPB, weighted average coupon rate, weighted original term, weighted remaining term, weighted seasoning, weighted original LTV, weighted calculated adjusted LTV, annualized CPR actual, annualized CPR estimate, CPR variance, variance as a % of actual, Wall Street CPR.

D. Drilldown

After a user has generated a report, the user can then drilldown into the report. Drilldown can be used in virtually any of the reports generated using the lender analysis and reporting system 10. For example, drilldown may be used on the recapture report generated in step 370 or the prepayment report generated in step 470.

Figure 5:
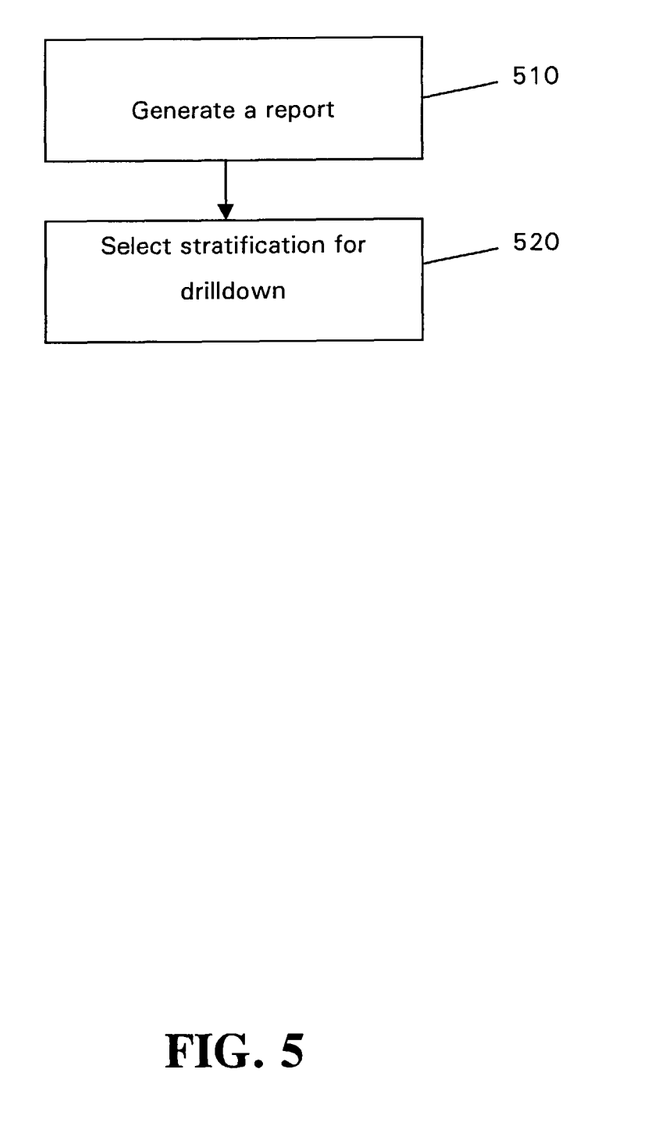
FIG. 5 is a block diagram of a reporting and analysis system in accordance with another exemplary embodiment.

FIG. 5 shows a block diagram of an exemplary process using drilldown. A report is provided in step 510. The user then uses the drilldown feature to further sort the information provided in the report as shown in step 520. The user can drilldown into the report by clicking over the stratification row (first column of the report) to determine which stratifications are available in which to drilldown. A menu list of available stratifications will appear. The user can position the cursor over the selection and click to make another drilldown selection. The data will be further sorted according to the stratification selected in the menu list. In this manner, the data can be sorted according to multiple stratifications to create a multiple layer report. For example, the initial stratification may be loan type. Once the report is generated then the user can drilldown into the report by selecting a further stratification such as loan purpose. In this manner the user will get information on a certain type of loan provided for a certain purpose.

In an exemplary embodiment, as drilldown selections are made, the population limiters selected will be reflected at the upper left side of the report. This drilldown procedure can be repeated through the remaining stratifications until no further segmentation is possible. To back up to a higher level of aggregation, the user can click while positioned over the link of the population limiter at the top left side of the screen. The drilldown process can then be resumed at this level.

Once a user has drilled down into the report, the user may be presented with the option to select either a two-level or three-level report with or without population limiters applied. The stratification variables that will be used in the multi-level report are reflected immediately to the right of the action button. To return to the drilldown functionality, the user can click on the Regular report button at the bottom of the display screen.

E. Portfolio Statistics

Portfolio statistics present historical trends of various loan information in addition to general portfolio statistics. Historical trends for any of the various aspects of the data can be generated. For example, portfolio statistics may provide historical trends of prepayment performance or delinquency performance for a selected period of time. Prepayment and delinquency performance are described in further detail as follows.

Prepayment statistics can be generated for a portfolio as of a selected month-end date. In one embodiment, the actual prepayment performance of a portfolio is output for a selected month and two previous months. The prepayment analysis can calculate the number and cumulative UPB of loans prepaid during different time periods relative to the aggregate population of each loan category. The output data can be reported in a variety of ways. For example, it can be reported by loan count or UPB.

Another embodiment provides delinquency statistics for a portfolio as of a selected month-end date. The output of this report reflects a portfolio's delinquency statistics categorized, for example, by 30 days, 60 days, 90 days and 90+ days delinquent. A number of report formats are available. For example, report options may include: delinquent by loan count, delinquent by UPB, bankruptcy (BK) & foreclosure (FC) by loan count, and BK & FC by UPB. The first two represent the entire portfolio including bankruptcy and foreclosure loans. The second two include only those loans that are classified as bankruptcy or foreclosure. A third option would be the entire portfolio excluding bankruptcy and foreclosure loans.

Still a further embodiment provides general characteristics on a portfolio as of the selected month-end date. General characteristics can include a variety of data such as a report on the averages of the loan data in the portfolio.

It should be understood that a number of portfolio statistics can be reported in addition to those disclosed. The disclosed reported statistics are only meant as examples and should not be construed to limit the claimed invention in any manner.

F. User Created Reports

The lender analysis and reporting system 10 may include the ability to allow the user to create a customized report This allows the user to have greater control over how their analytical reports are structured. While not attempting to replace structured reporting, user created reports allow users to use the entire specter of statistical data available for their portfolio(s). Users can build reports by selecting statistical data (analysis variables/columns on report) as well as defining how the data should be grouped and summarized (stratification variables/dimensions).

User created reports may be an especially valuable analytical tool in the hands of sophisticated users, thoroughly familiar with the statistical data available for reporting. Unlike structured reports, user created reports offer users tremendous flexibility in selecting and formatting analysis variables to be included in the reports. User created reports allow advanced users the ability to develop and re-use a collection of customized reports tailored to their analytical needs. In an exemplary embodiment, user created reports may offer the following user functionality: (1) report field selection (columns), (2) report stratification selection (rows), (3) report delivery options selection, and (4) storage and retrieval of custom ad-hoc reports.

In preparing a user created report, users need to specify the classification variables (loan characteristics) used in report stratification and the order (hierarchy) of classification variables that define report stratification. In an exemplary embodiment, every dimension should be available for selection. Having selected up to three (or more) classification variables, the user needs to arrange them in a particular order based on their analytical needs.

The lender analysis and reporting system 10 should enable users to save their custom reports so they can be reused again. This functionality will enable users to create their own report library similar to the collection of structured reports.

Those users who have custom reports can access their report library and select (by name) a specific report to be processed by the lender analysis and reporting system 10. It is assumed that a saved report includes defined analysis and classification variables. The defined analysis and classification variables in the saved report can be changed by creating a new report, or, in an alternative embodiment, the report may be changed without creating a new report.

Figure 6:
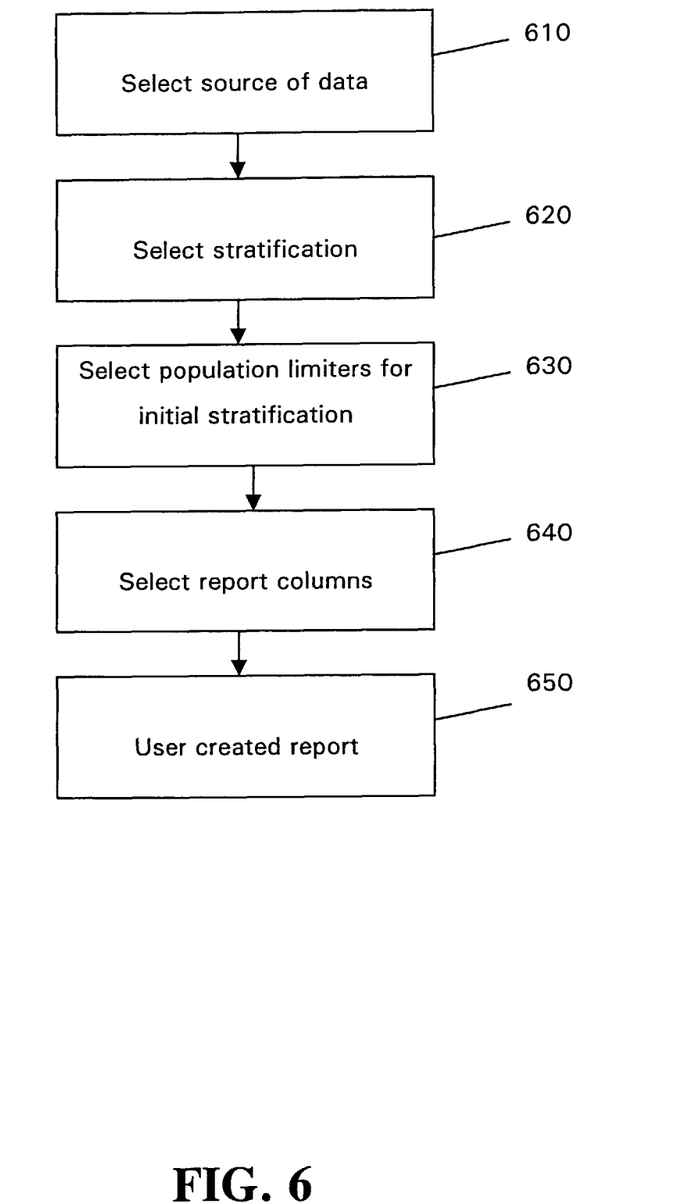
FIG. 6 is a block diagram of a reporting and analysis system in accordance with another exemplary embodiment.

Referring to FIG. 6, user created reports are generally created through a four-step process. Step 610 includes selecting the source of the data. Generally, the source of the data may include the user's data, industry-wide data, or the user's data and industry data.

In step 620, the user selects the various stratifications to use in the report. In an exemplary embodiment, the user selects a minimum of two and a maximum of twenty loan characteristics. This selection can then be used to narrow down the portfolio for analysis, in addition to setting up the initial row stratification and drilldown capabilities. The stratifications can be selected by clicking on a checkbox to the right of the desired stratifications.

In step 630, the user can specify population limiters to place on the initial stratifications. For example, for each stratification selected in step 620, a list of available values is presented. To limit the population to be analyzed, select one item from the list. By selecting an item from the list, the population will be limited to just those loans meeting that criteria. The selection option may be limited to one item or the "all" item in the list. For example, if the agency name is selected as the stratification in step 620, then a list presented in step 630 may contain FHLMC, FNMA, PORTFOLIO, etc. In this example, selecting FHLMC from the list limits the population to just loans sold to FHLMC.

For the most typical query, it is recommended that the date of data be used as the starting stratification. Starting with another variable presents the first report with accumulated totals of all available month's data. To separate those statistics by month, drilldown into the date of data stratification.

In step 640 the user specifies the report columns to use. This can be done by selecting all the analysis variables to be presented in the report columns. The first column can be configured to default to the initial report stratification selected in the step 620 and the second column can be, for example, the loan count. The columns can also be shown in alphabetical order.

G. Miscellaneous Features

In addition to the above described features, the lender analysis and reporting system 10 may also include a variety of other features. Such features may include favorites, market trend analysis, and sorting. These features will be described in further detail as follows.

The favorites feature enables retrieval of previously saved drilldown paths and the ability to save new drilldown paths for future use. The statistics from the report that was run are not saved; the tab selection, report selection and drilldown path are saved. When run again, it will present the user with the option to choose the month-end analysis date and other applicable options for the saved report.

The market trend analysis includes research and analysis of the real estate and employment markets of metropolitan statistical areas (MSAs). The market trend analysis provides the user with an outlook for the real estate market in the desired MSA. In an exemplary embodiment, the market trend analysis can be accessed from any report using a direct link.

The sorting feature allows the user to sort certain columns simply by clicking on that column. In an exemplary embodiment, the columns that are capable of being sorted are underscored. To reverse sort, click again on the column header. Those columns not underscored cannot be sorted. Once a multi-level report is selected, no columns in the report provide the sort feature.

Other various features may be included as part of the lender analysis and reporting system 10. For example, the lender analysis and reporting system 10 may also include a help function to guide the user in navigating and using the system.

It may also include features such as instant messaging, e-mail, functionality to aid clients in tracking marketing campaigns (possibly through a client specific field that tracks other pertinent information), tracking of multiple mortgage relationships, or selection of a particular interest rate that would then be graphed (as a trend in time) over the currently displayed graph (i.e. propensity to prepay graph).

While the exemplary embodiments illustrated in the figures and described above are presently preferred, it should be understood that these embodiments are offered by way of example only. Other embodiments may include, for example, a wide variety of ways to analyze and report mortgage loan information, such as, wireless application protocol (WAP), personal digital assistant (PDA) protocols, and other presentation means. Further, while exemplary embodiments describe the invention in the context of mortgage loan information, the invention may extend to other forms of loan information. The invention is not limited to a particular embodiment, but extends to various modifications, combinations, and permutations that nevertheless fall within the scope and spirit of the appended claims.

What is claimed is:

1. A method for reporting and analyzing mortgage information, the method comprising:
   receiving portfolio information at a computer from a lender;
   standardizing data in the received portfolio information, appending predictive modeling scores, and measuring recapture information, the recapture information being derived by matching mortgage loan payoff and new loan origination activity at a computer;
   presenting the lender at a computer with the received portfolio information, appended information and aggregated industry information; and
   providing for a dynamic definition of data sets and report sets using the received portfolio information, appended predictive scores and recapture information at a computer.

2. The method of claim 1, wherein the data sets comprise stratification levels and the report sets comprise choice of portfolio dates and analysis periods.

3. The method of claim 2, wherein the stratification levels comprise over 30 stratification choices.

4. The method of claim 1, wherein providing for dynamic definition comprises disaggregation, drill-down, and aggregation of recapture metrics within a plurality of dimensions.

5. The method of claim 1, wherein providing for dynamic definition comprises querying monthly mortgage portfolio data.

6. The method of claim 1, further comprising predictive modeling to provide aggregated forecasts for a plurality of data sets.

7. The method of claim 1, wherein receiving portfolio information from a lender comprises communicating portfolio information over a network.

8. The method of claim 7, wherein received portfolio information and industry recapture metrics are summarized and stored in a cube data structure.

9. The method of claim 7, wherein a user interface is presented at a client device and a processing application is hosted at a server device.

10. The method of claim 9, wherein the processing application distributes processing load across multiple servers.

11. The method of claim 1, wherein the received portfolio information is standardized into a common data set using pre-determined code sets.

12. The method of claim 1, further comprising combining data across multiple reporting dates.

13. A mortgage reporting and analysis system comprising:
a communication module configured to receive portfolio information from a lender via a communication network and communicate processed lender information and industry information to the lender; and
a processing module configured to standardize received portfolio information and match loan payoff and new loan origination activity from a plurality of lenders, the processing module being further configured to dynamically define data sets and report sets using the received portfolio information and industry metrics.

14. The mortgage reporting and analysis system of claim 13, wherein the dynamic definition performed by the processing module is further comprises disaggregation, drill-down, and aggregation of recapture metrics within a plurality of dimensions.

15. The mortgage reporting and analysis system of claim 13, further comprising an authentication module configured to limit access to lenders having proper usernames and passwords.

16. The mortgage reporting and analysis system of claim 13, further comprising a modeling module configured to estimate future loan information.

\* \* \* \* \*